US008662191B2

(12) United States Patent
Orr et al.

(10) Patent No.: US 8,662,191 B2
(45) Date of Patent: Mar. 4, 2014

(54) SPRINKLER ASSEMBLY FOR ATTACHMENT TO A PIPING SYSTEM

(71) Applicant: The Viking Corporation, Hastings, MI (US)

(72) Inventors: Shawn G. Orr, Grand Rapids, MI (US); Scott T. Franson, Hastings, MI (US)

(73) Assignee: The Viking Corporation, Hastings, MI (US)

( * ) Notice: Subject to any disclaimer, the term of this patent is extended or adjusted under 35 U.S.C. 154(b) by 0 days.

(21) Appl. No.: 13/890,286

(22) Filed: May 9, 2013

(65) Prior Publication Data

US 2013/0240219 A1 Sep. 19, 2013

Related U.S. Application Data

(62) Division of application No. 13/014,470, filed on Jan. 26, 2011, now Pat. No. 8,459,370.

(51) Int. Cl.

| | |
|---|---|
| ***A62C 37/11*** | (2006.01) |
| ***A62C 37/08*** | (2006.01) |
| ***A62C 35/62*** | (2006.01) |
| ***A62C 35/68*** | (2006.01) |
| ***F16L 23/00*** | (2006.01) |
| ***F16L 3/10*** | (2006.01) |

(52) U.S. Cl.
USPC ................................ 169/37; 169/17; 285/406

(58) Field of Classification Search
USPC ............ 169/17, 37–41, 56, 57; 285/239, 242, 285/328, 406, 411, 412, 420; 239/600
See application file for complete search history.

(56) References Cited

U.S. PATENT DOCUMENTS

| | | | | |
|---|---|---|---|---|
| 4,033,615 | A | 7/1977 | Miller, Jr. et al. | |
| 4,091,872 | A * | 5/1978 | Mountford | 169/37 |
| 4,220,208 | A * | 9/1980 | Jackson et al. | 169/17 |
| 4,258,795 | A * | 3/1981 | Hansen | 169/19 |
| 4,639,020 | A | 1/1987 | Rung et al. | |
| 5,109,929 | A | 5/1992 | Spears | |
| 5,221,113 | A | 6/1993 | Stoll | |
| 5,415,239 | A * | 5/1995 | Kotter et al. | 169/41 |
| 2005/0012329 | A1 | 1/2005 | Brown | |
| 2005/0236166 | A1* | 10/2005 | Bentzien et al. | 169/37 |
| 2007/0187116 | A1 | 8/2007 | Jackson et al. | |
| 2009/0294138 | A1* | 12/2009 | Jackson et al. | 169/17 |
| 2010/0104396 | A1 | 4/2010 | Hama et al. | |
| 2010/0170963 | A1 | 7/2010 | Kah, Jr. | |
| 2010/0252282 | A1 | 10/2010 | Sarkisyan et al. | |

* cited by examiner

*Primary Examiner* — Darren W Gorman
(74) *Attorney, Agent, or Firm* — Harness, Dickey & Pierce, P.L.C.

(57) ABSTRACT

A sprinkler assembly can utilize an adapter having straight threads and an internal sealing member therein to attach the sprinkler to a piping system. The sprinkler may include tapering threads that engage with the straight threads of the adapter and compress the sealing member therein to form a fluid-tight seal. A sprinkler assembly can utilize a fitting that is attached to an extension member containing the sprinkler. The fitting allows the sprinkler and extension member to be coupled to the piping system with a solvent weld. A sprinkler assembly can utilize an attachment system to couple a sprinkler attached to an extension member to a piping system. The attachment system can include a first fitting attached to the connection member, a second fitting attached to the piping system, and a clamping member to clamp the two fittings together.

8 Claims, 13 Drawing Sheets

SPRINKLER ASSEMBLY FOR ATTACHMENT TO A PIPING SYSTEM

CROSS-REFERENCE TO RELATED APPLICATIONS

This application is a divisional of U.S. patent application Ser. No. 13/014,470, filed on Jan. 26, 2011. The entire disclosure of the above application is incorporated herein by reference.

FIELD

The present disclosure relates to automatically operated fire extinguishing systems used for buildings and the like, and relates specifically to sprinkler assemblies utilizing adapters and fittings to attach to the fire extinguishing systems.

BACKGROUND AND SUMMARY

The statements in this section merely provide background information related to the present disclosure and may not constitute prior art.

Automatic sprinkler systems for fire protection have been available for many years. The automatic sprinkler systems can be dry-pipe systems or wet-pipe systems. In these systems, the automatic sprinklers are adapted to be installed in the piping system. In dry systems, the sprinkler can have a valve at the inlet end to prevent water or other fire extinguishing fluid in the piping system from entering the sprinkler until the sprinkler is put into operation by collapse of a thermally responsive mechanism. In wet systems, the water or fire extinguishing fluid can be in the piping system and in the sprinkler and is put into operation by collapse of the thermally responsive mechanism.

The piping system can be plastic and include a plurality of access members, such as T-joints, that allow the sprinkler to be coupled to the piping system. The plastic piping systems, however, can be damaged when attaching the sprinklers to the piping system. For example, brass fittings or inserts utilized in the sprinkler are threaded into the T-joints. As a result, overtightening may cause the plastic piping to fracture or break thereby requiring repair. In some systems, the T-joints can include brass fittings or inserts that can cause the plastic to fracture or break when a sprinkler is attached thereto and overtightened.

Adapters can be utilized to couple the sprinkler to the piping system. The adapters can be plastic while the body of the sprinkler can be metal, such as brass. The sprinkler body can be attached to the adapter by a threaded engagement. In particular, the adapter can include a threaded bore that receives a threaded projection on the sprinkler body. Typically, the threaded bore and the threaded projection are both tapered. In order to ensure a fluid-tight engagement between the tapered threads, the installer typically applies a sealing tape to the threads of the sprinkler body prior to threading the sprinkler body into the adapter. The need to add a sealing tape to the threads of the body is time consuming and inefficient. Additionally, when servicing the sprinkler system, the removal of the sprinkler from the adapter requires the worker to remove the remnants of the sealing tape from the threads prior to adding new sealing tape and threading the sprinkler body back into the adapter, which is further time-consuming. Moreover, engagement of the tapering threads of the adapter and the sprinkler can cause significant internal stresses. As a result, the plastic adapter may be susceptible to cracking or breaking as a result of overtightening the sprinkler body when threading it to the adapter.

A sprinkler assembly, according to principles of the present disclosure, can utilize an adapter that can eliminate the need to use a sealing tape when threading the sprinkler body thereto. The adapter can include an internal sealing member that engages with the end of the sprinkler when threaded therein. The sealing member can be reusable such that the sprinkler can be removed and reattached to the adapter. The adapter may include straight threads while the sprinkler utilizes tapered threads.

A sprinkler assembly, according to the principles of the present disclosure, can eliminate the need to screw the sprinkler into the piping system. The sprinkler can utilize one or more fittings that connect with the piping system without a threading engagement. A fitting can be plastic and welded to the piping system, such as to the T-joint. In some embodiments, the fitting can be a two-piece connection wherein a first one of the fittings is coupled to the piping system and the second one of the fittings is coupled to an extension member containing the sprinkler. The two fittings can include engagement features that enable the two fittings to be clamped together with a clamping device in a fluid-tight manner.

Further areas of applicability will become apparent from the description provided herein. It should be understood that the description and specific examples are intended for purposes of illustration only and are not intended to limit the scope of the present disclosure.

DRAWINGS

The drawings described herein are for illustration purposes only and are not intended to limit the scope of the present disclosure in any way.

DETAILED DESCRIPTION

Figure 1:
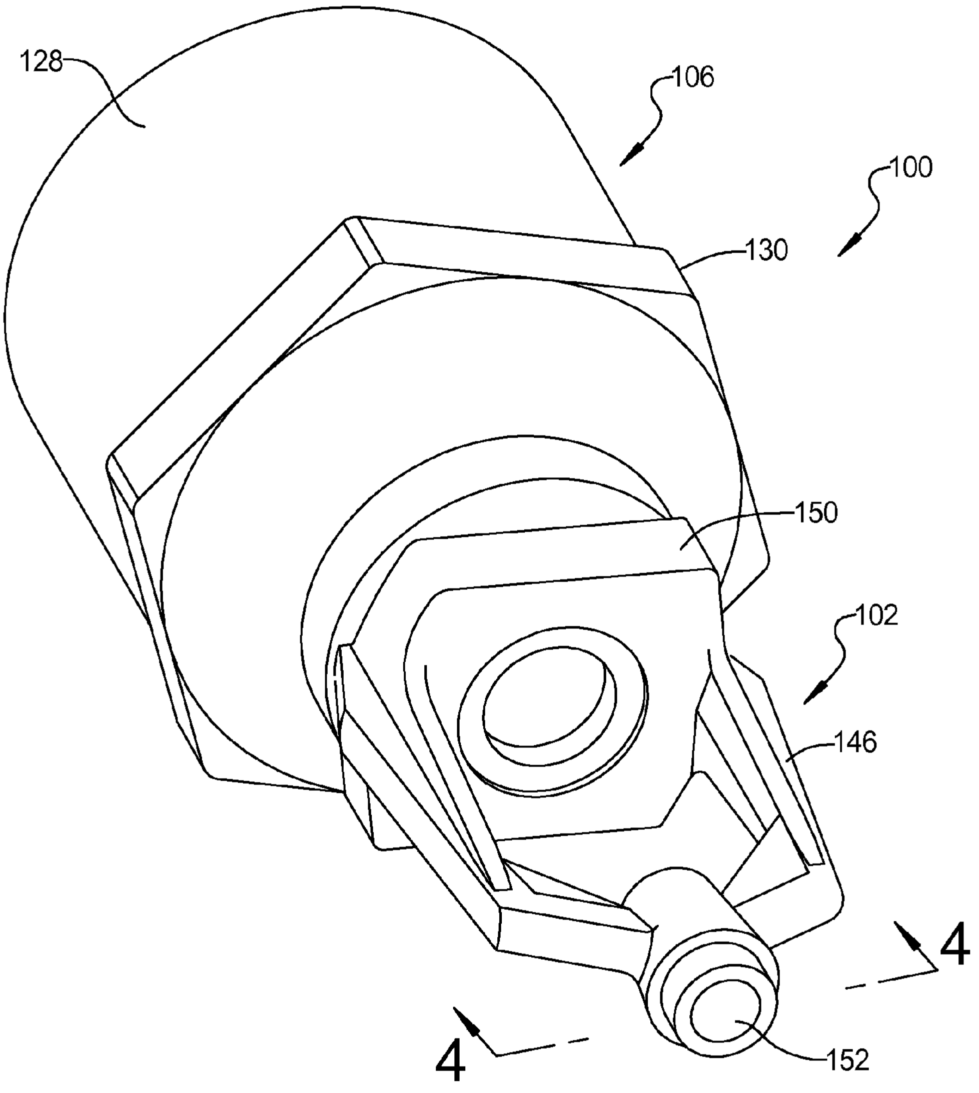
FIG. 1 is a perspective view of an adapter with a sprinkler body attached thereto, according to the principles of the present disclosure.
Figure 2:
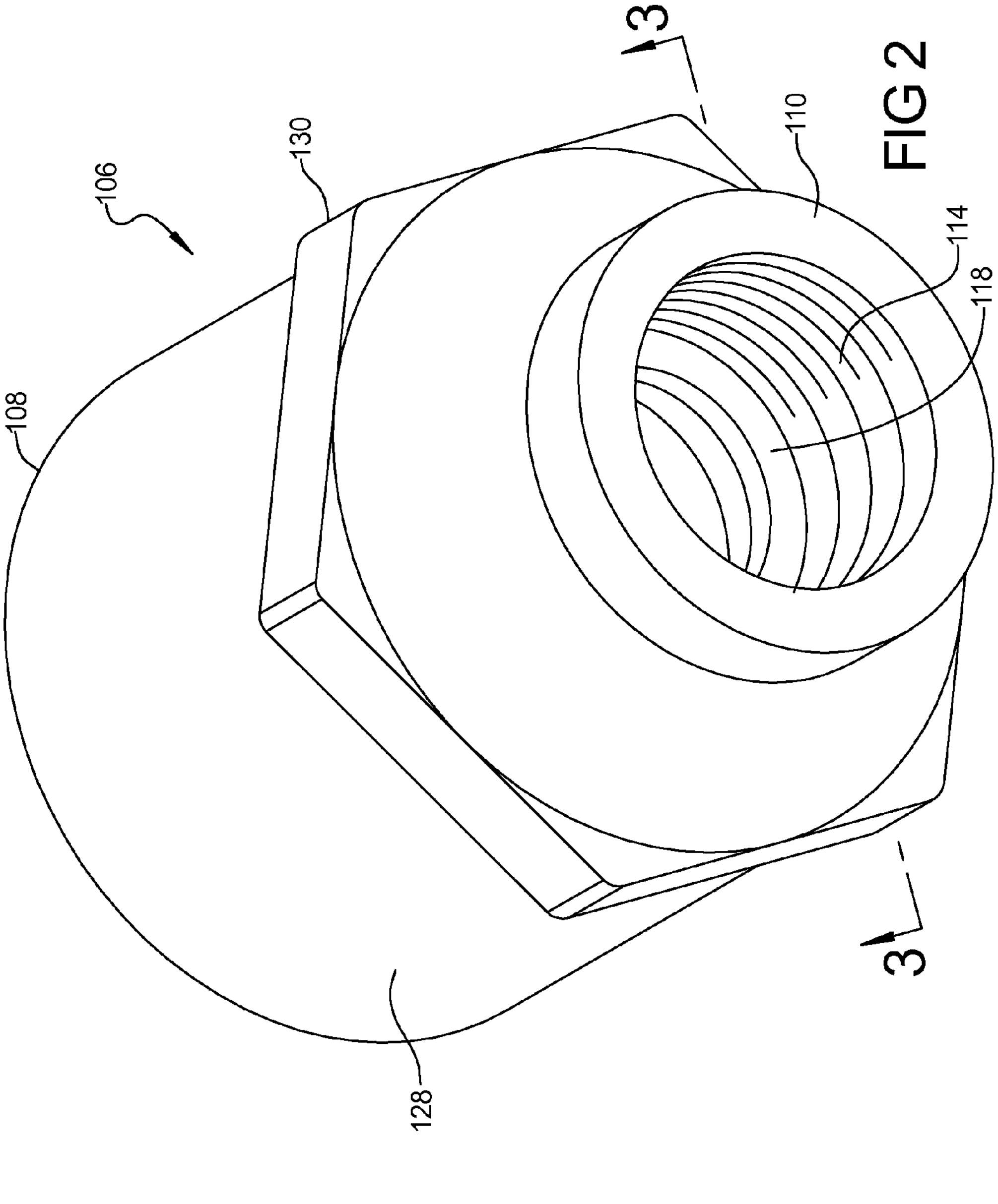
FIG. 2 is a perspective view of the adapter shown in FIG. 1.

The following description is merely exemplary in nature and is not intended to limit the present disclosure, application, or uses. It should be understood that throughout the drawings, corresponding reference numerals indicate like or corresponding parts and features.

With reference to FIGS. 1-6, a sprinkler assembly 100 that can be utilized to attach a sprinkler 102 (the trigger mechanism and deflector have been omitted in some views for ease of illustration) to a piping system 104 (FIG. 6) of a fire extinguishing system is shown. Piping system 104 can include plastic piping, such as CPVC by way of non-limiting example. Sprinkler assembly 100 utilizes an adapter 106 (FIG. 1) to couple sprinkler 102 to piping system 104. Adapter 106 can be a molded plastic, such as CPVC by way of non-limiting example. Additional materials can include, but are not limited to, PEX (cross-linked polyethylene), LDPE (low density polyethylene), HDPE (high density polyethylene), and polybutylene. Sprinkler assembly 100 can be used in both a dry and wet pipe fire extinguishing system.

Figure 3:
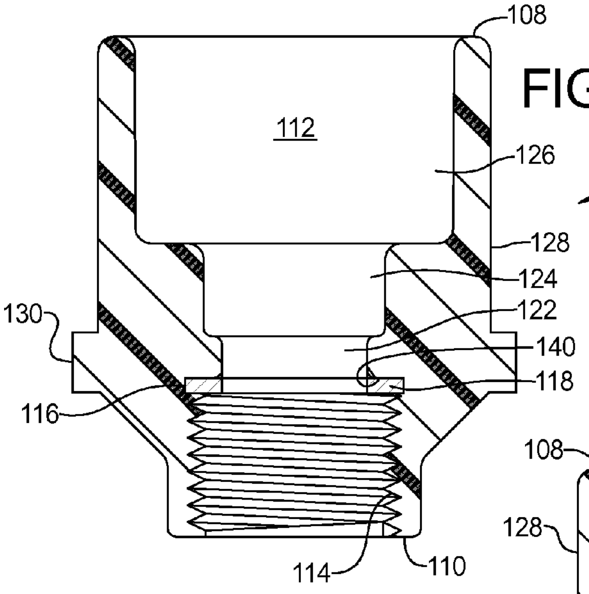
FIG. 3 is a cross-sectional view taken along line 3-3 of the adapter shown in FIG. 2.

As best shown in FIG. 3, adapter 106 has an inlet end 108 and an outlet end 110 with a central passageway 112 extending therebetween. Inlet end 108 faces piping system 104 while outlet end 110 faces sprinkler 102. Passageway 112 includes an internally threaded section 114 that extends from outlet end 110 toward inlet end 108. Threaded section 114 terminates at a radial outwardly extending annular recess 116 that contains a sealing member 118 therein. Sealing member 118 includes a central opening 120 (best shown in FIG. 5) that allows water or fire extinguishing fluid to flow from inlet end 108 through passageway 112 and exit outlet end 110. Passageway 112 also includes a plurality of stepped sections 122, 124, 126 that have a diameter that is progressively larger as the sections are closer to inlet end 108. Specifically, first section 122 adjacent annular recess 116 can have a first diameter while second section 124 has a second diameter larger than the first diameter and third section 126 which is adjacent inlet end 108 can have a third diameter larger than both the first and second diameters.

Adapter 106 can have a generally cylindrical exterior surface 128 with an integral nut section 130 that facilitates engagement of adapter 106 with a wrench. Stepped section 126 of the adapter 106 defines a mating surface that can engage with a complementary mating surface 134 on piping system 104 through an adhesive connection. Mating surface 134 can be on a tubing section 132 that can also be received in and adhesively connected to a T-joint 135 of piping system 104. The engagement of mating surfaces 126, 134 forms a fluid-tight seal therebetween. Adapter 106 can be attached to piping system 104 with an adhesive solvent by solvent welding, as known in the art, or by other known adhesive techniques.

Threaded section 114 is configured to receive sprinkler 102. Threaded section 114 includes straight threads. Straight threads means that the diameter of passageway 112 within threaded section 114 does not change as threaded section 114 extends from outlet end 110 to annular recess 116.

Figure 4:
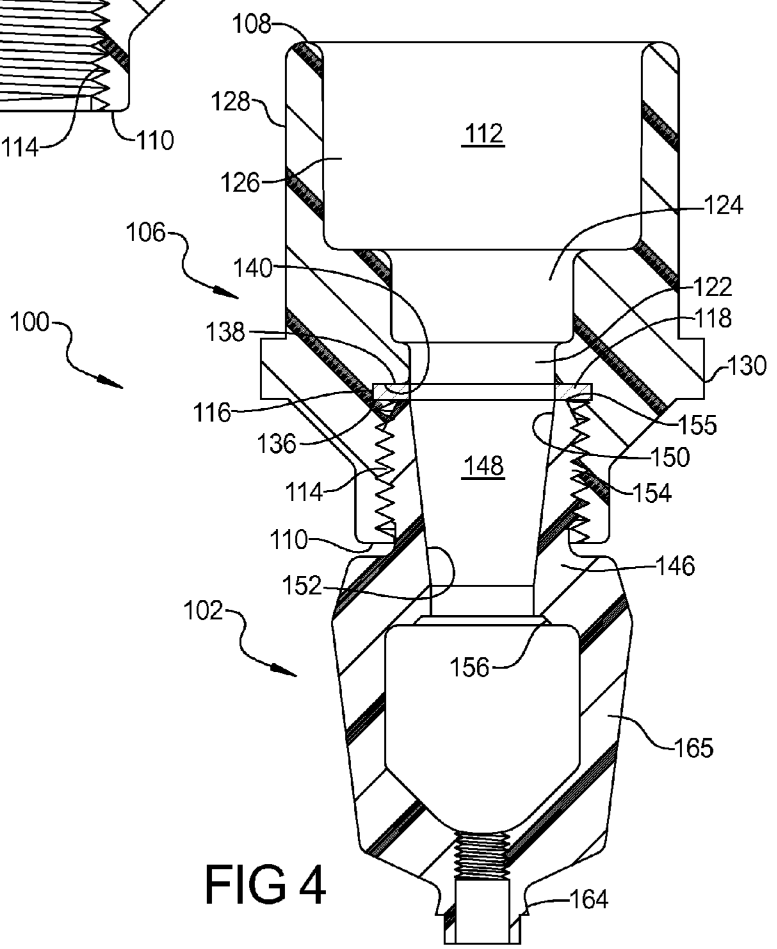
FIG. 4 is a cross-sectional view taken along line 4-4 of the adapter and sprinkler body of FIG. 1.
Figure 6:
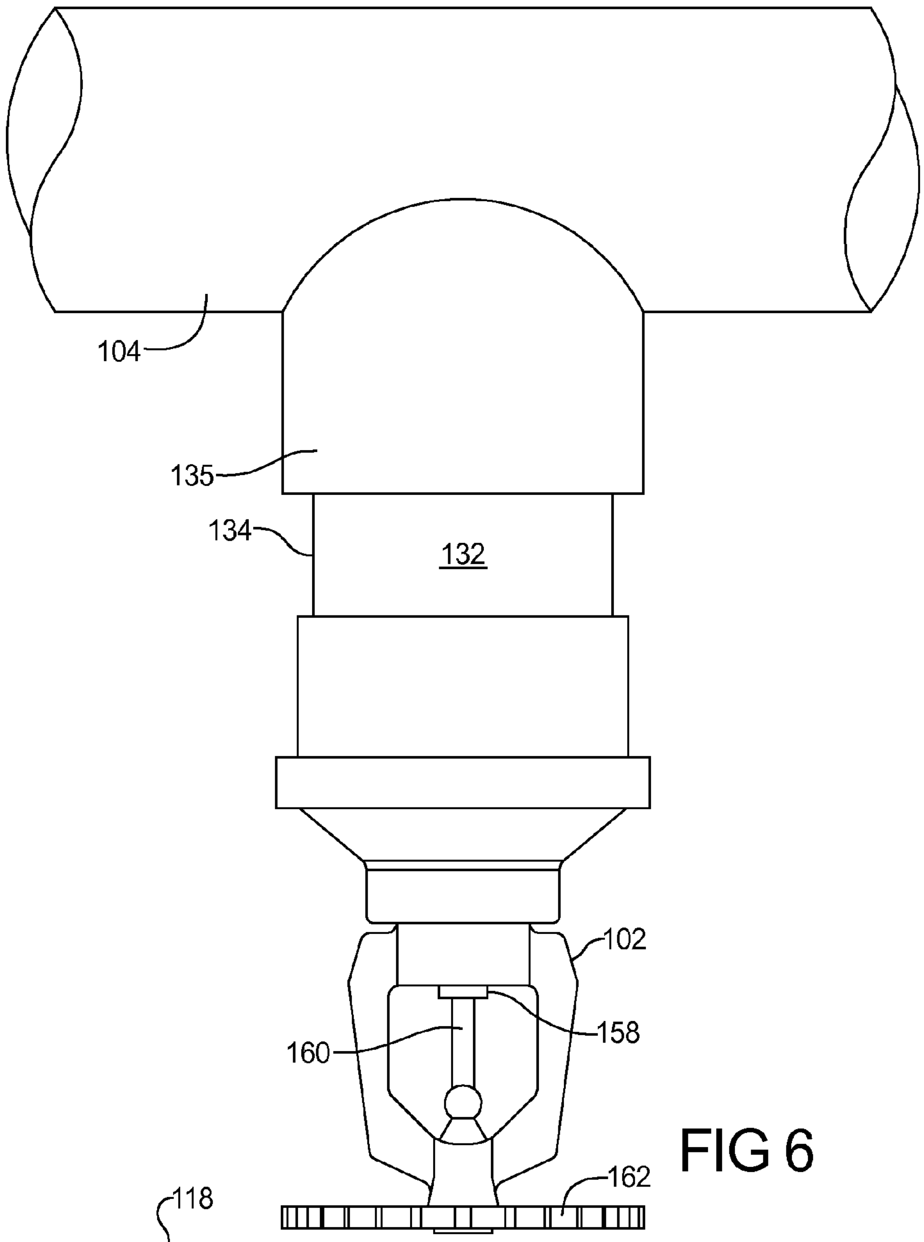
FIG. 6 is a fragmented plan view of the adapter and sprinkler of FIG. 4 attached to the piping system of a fire extinguishing system.
Figure 5:
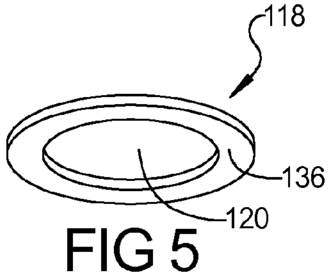
FIG. 5 is a perspective view of the sealing member utilized in the adapter.
Figure 7:
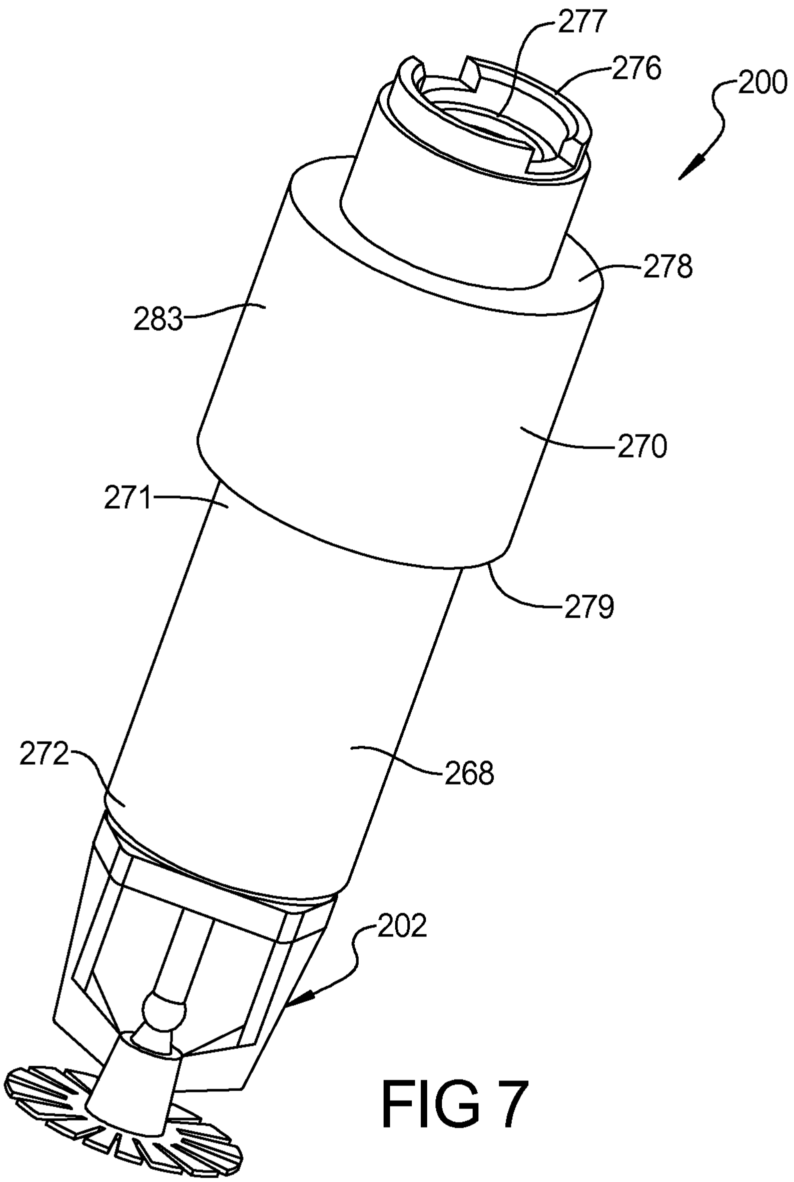
FIG. 7 is a perspective view of a dry sprinkler assembly including a fitting and extension member along with a sprinkler and inlet member attached thereto.
Figure 8:
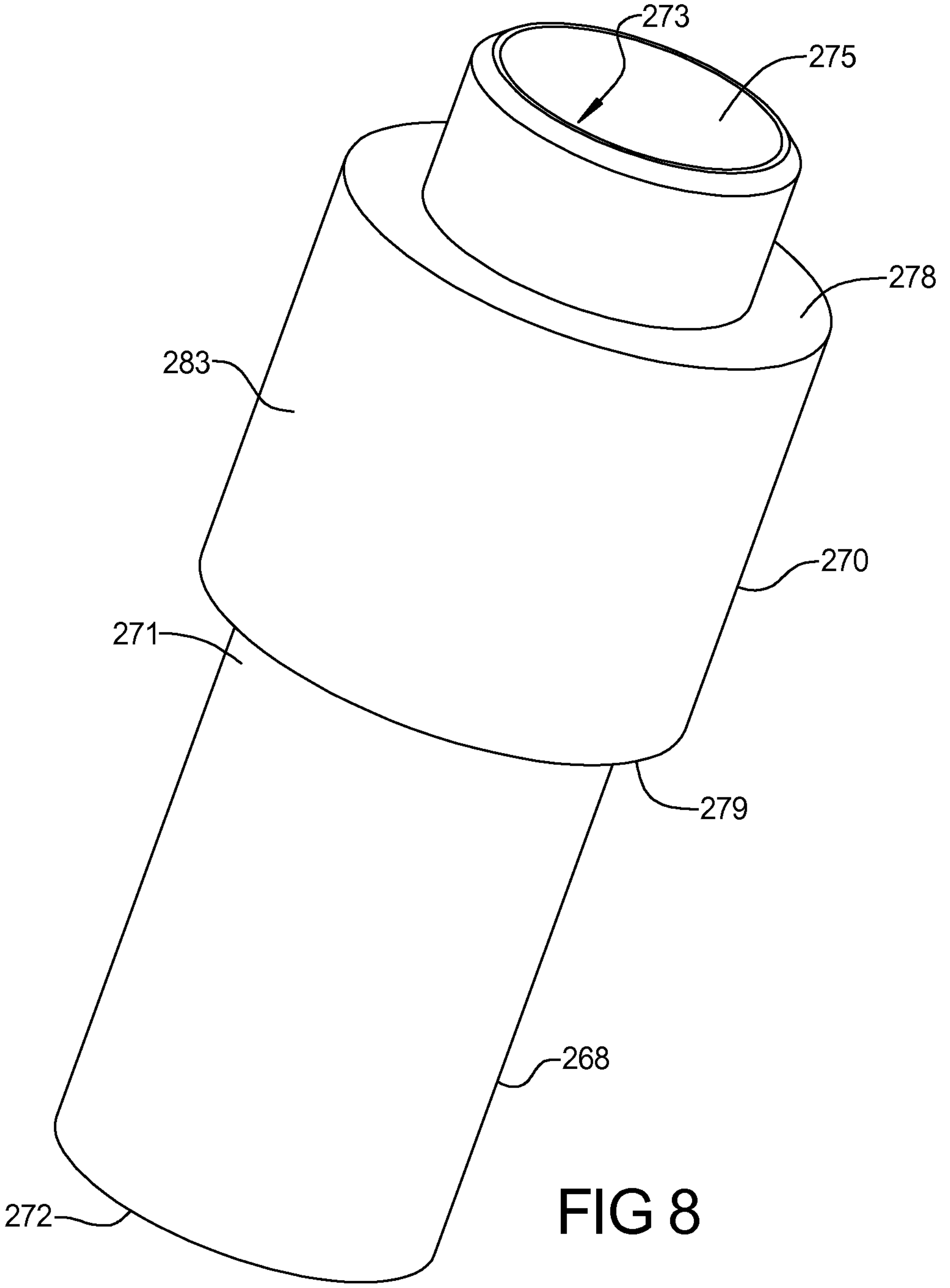
FIG. 8 is a perspective view of the fitting and extension member of FIG. 7 according to the principles of the present disclosure.
Figure 9:
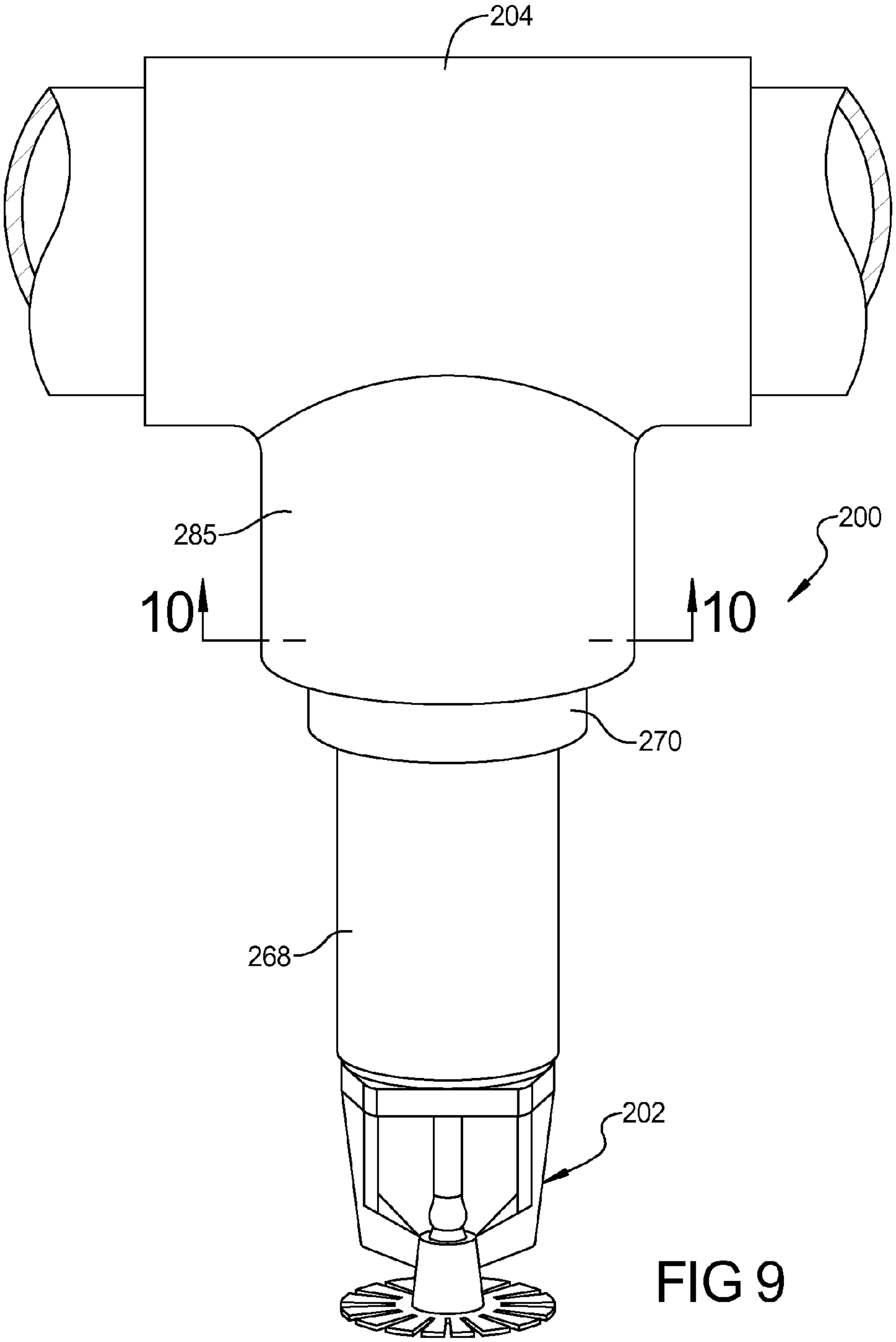
FIG. 9 is a perspective view of the dry sprinkler assembly of FIG. 8 attached to a piping system of a fire extinguishing system.

Sealing member 118 can be circular with opposite first and second surfaces 136, 138 that can provide a fluid-tight engagement between adapter 106 and sprinkler 102, as best shown in FIG. 4. In particular, second surface 138 rests at least partially on a shoulder 140 that forms a transition from annular recess 116 to first section 122. First surface 136 engages with sprinkler 102, as described below. Sprinkler 102 compresses sealing member 118 between sprinkler 102 and shoulder 140 such that first and second surfaces 136, 138 form a fluid-tight seal between sprinkler 102 and adapter 106. Central opening 120 of sealing member 118 communicates with passageway 112 of adapter 106 to allow water or fire extinguishing fluid to flow through adapter 106 and into sprinkler 102.

Sealing member 118 is resilient and can form a fluid-tight seal, as described above. The resilient nature of sealing member 118 allows sealing member 118 to be reused when a sprinkler 102 is removed from adapter 106 and subsequently reinserted or a new sprinkler is inserted. Sealing member 118 can be made from a variety of materials. For example, sealing member 118 can be Teflon®, EPDM (ethylene propylene diene Monomer), Buna-N®, PTFE (polytetrafluoroethylene), Kalrez®, and FEP (fluorinated ethylene propylene), and the like, by way of non-limiting example.

Sealing member 118 can be formed separate from adapter 106. In some embodiments, adapter 106 is formed or molded separate from sealing member 118. Sealing member 118 can be subsequently inserted into annular recess 116. In some embodiments, adapter 106 is molded or formed around sealing member 118. In this case, sealing member 118 is formed and placed in a mold. Adapter 106 is then molded around sealing member 118 such that annular recess 116 and shoulder 140 are formed around sealing member 118. The outer diameter of sealing member 118 can be greater than the inner diameter of threaded section 114 and first section 122. As a result, sealing member 118 can be retained within annular recess 116 and is unlikely to be accidentally dislodged or removed therefrom.

As shown in FIG. 4, sprinkler 102 includes a body 146 having an inner passageway 148 that extends from an inlet end 150 to an outlet end 152. Body 146 includes an externally threaded section or projection 154 that allows body 146 to be threaded into adapter 106. Specifically, threaded section 154 is configured to engage with threaded section 114 of adapter 106 to retain sprinkler 102 to adapter 106. Threaded section 154 can include tapering threads. Tapering threads means that the outer diameter of threaded section 154 decreases as threaded section 154 extends toward inlet end 150. Body 146 includes an engaging end surface 155 that engages with and seals against first surface 136 of sealing member 118. Body 146 can be metal, such as brass, by way of non-limiting example.

Passageway 148 can taper as it extends from inlet end 150 toward outlet end 152. The tapering can be a gradual reduction in the internal diameter or a stepped reduction. The dimensions of passageway 148 and passageway 112 are selected to provide a desired flow rate through sprinkler 102 in the event sprinkler 102 is activated. Outlet end 152 can include a recessed section 156 that is configured to receive a support plug 158 (FIG. 6) which can be held in place by a thermally responsive element 160 of any selected type. A deflector 162 can be attached to the boss 164 provided on the support frame 165 of sprinkler 102. Thermally responsive element 160 holds support plug 158 engaged with recessed section 156 to form a fluid-tight seal therebetween in a manner that is well known in the art. In this manner, water or fire extinguishing fluid within piping system 104 and passageways 112, 148 is retained therein until such time as operation of sprinkler 102 is commenced by a thermal event.

Sprinkler 102 described above can be a typical sprinkler as known in the art. As such, a more detailed description of sprinkler 102 is not provided herein.

Sprinkler 102 can be attached to adapter 106 by rotating sprinkler 102 relative to adapter 106 while threaded section 154 is engaged with threaded section 114. The relative rotation can occur until engaging surface 155 adjacent inlet end 150 engages with and compresses against sealing member 118. The compression of first surface 136 by engaging surface 155 forms a fluid-tight seal therebetween along with forming a fluid-tight seal between second surface 138 and shoulder 140. As a result, sprinkler 102 is attached to adapter 106 in a fluid-tight manner. The use of tapering threaded section 154 engaging with straight or non-tapering threaded section 114 prevents the occurrence of high internal stresses that would occur if both threaded sections were comprised of tapering threads. The reduced internal stresses on adapter 106 help prevent or eliminate fracturing or rupturing of adapter 106.

To remove sprinkler 102, sprinkler 102 is rotated relative to adapter 106 in the opposite direction than that utilized to attach sprinkler 102 to adapter 106. The resilient nature of sealing member 118 allows a fluid-tight seal to be formed again when sprinkler 102 (the same sprinkler or a different sprinkler) is attached to adapter 106. It should be appreciated that sprinkler 102 can be attached to adapter 106 while adapter 106 is free from piping system 104 or while attached to piping system 104. When sprinkler 102 is attached to adapter 106 and not attached to piping system 104, the assembled sprinkler 102 and adapter 106 can be subsequently secured to T-joint 135 of piping system 104, in the same manner described above.

Thus, the use of an adapter 106 having an internal sealing member 118 allows for a sprinkler 102 to be repeatedly attached to and removed from adapter 106 while forming a fluid-tight seal each time. The ability of sealing member 118 to form a fluid-tight seal eliminates the need for a sealing tape to be applied to threaded section 154. Additionally, the use of sealing member 118 eliminates the necessity of removing sealing tape from threaded section 154 when reusing a sprinkler 102 that has previously been engaged in a fluid-tight manner with an adapter 106. Additionally, the retaining of sealing member 118 within annular recess 116 inhibits the possibility of sealing member 118 accidentally being removed from or falling out of adapter 106. Thus, an adapter 106 including an internal sealing member 118 according to the present disclosure can advantageously facilitate the installation and servicing of sprinklers 102. Moreover, the ability of adapter 106 to receive a sprinkler 102 having a tapering threaded section 154 allows adapter 106 to receive other sprinklers that may not have been included in the sprinkler assembly 100. The tapering threaded section 154 of sprinklers 102 that are included in sprinkler assembly 100 also allows sprinkler 102 to be utilized in prior art adapters wherein the internal threaded section is also tapering. Thus, the sprinkler assembly 100 of the present disclosure can advantageously accommodate sprinklers that are not provided as part of sprinkler assembly 100 and/or allows the use of a sprinkler 102 from a sprinkler assembly 100 to be used with prior art adapters and connected to the piping system.

Figure 10A:
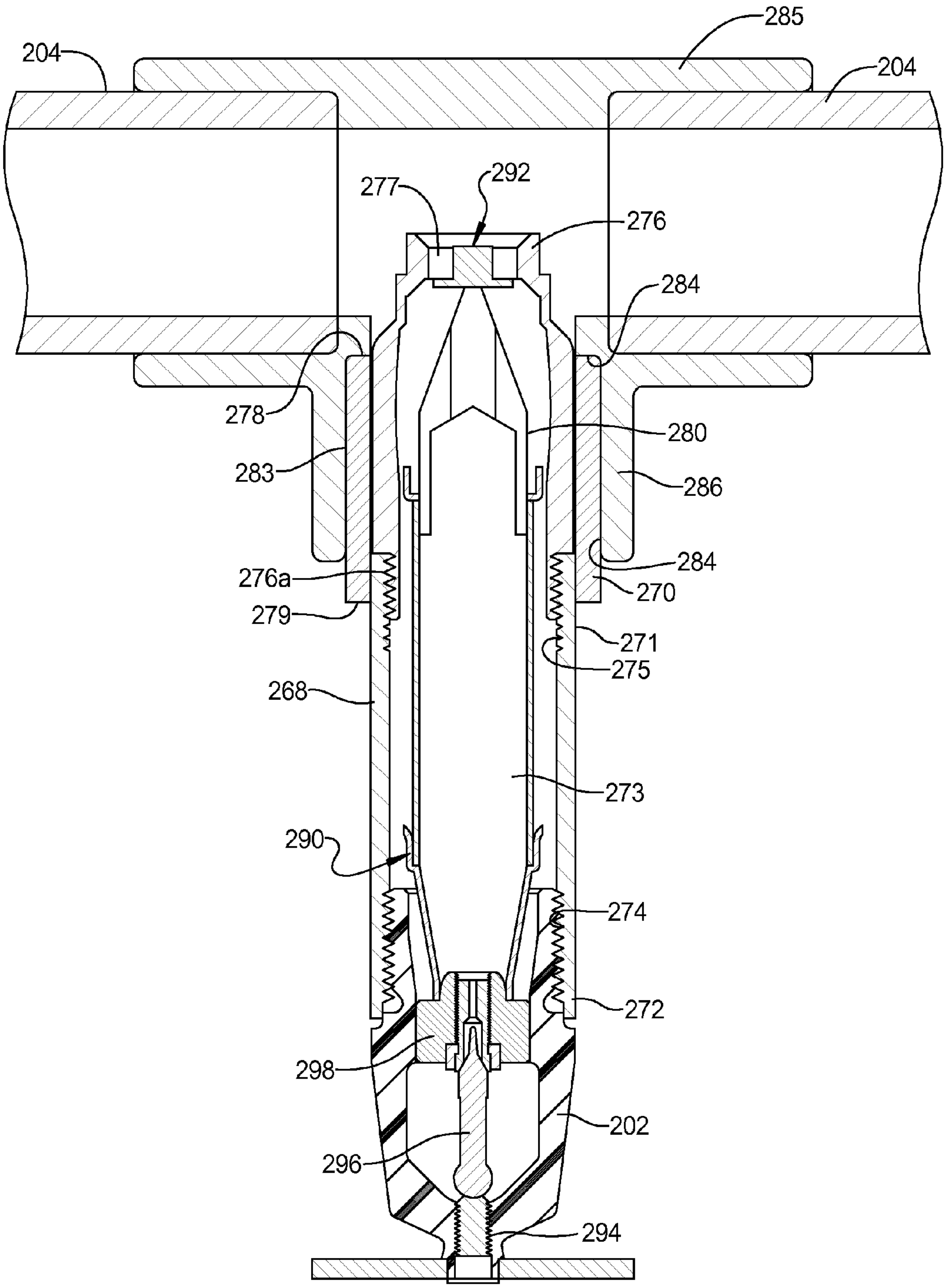
FIGS. 10A and 10B are cross-sectional views along line 10-10 of FIG. 9 showing a welded connection and a threaded connection, respectively.
Figure 10B:
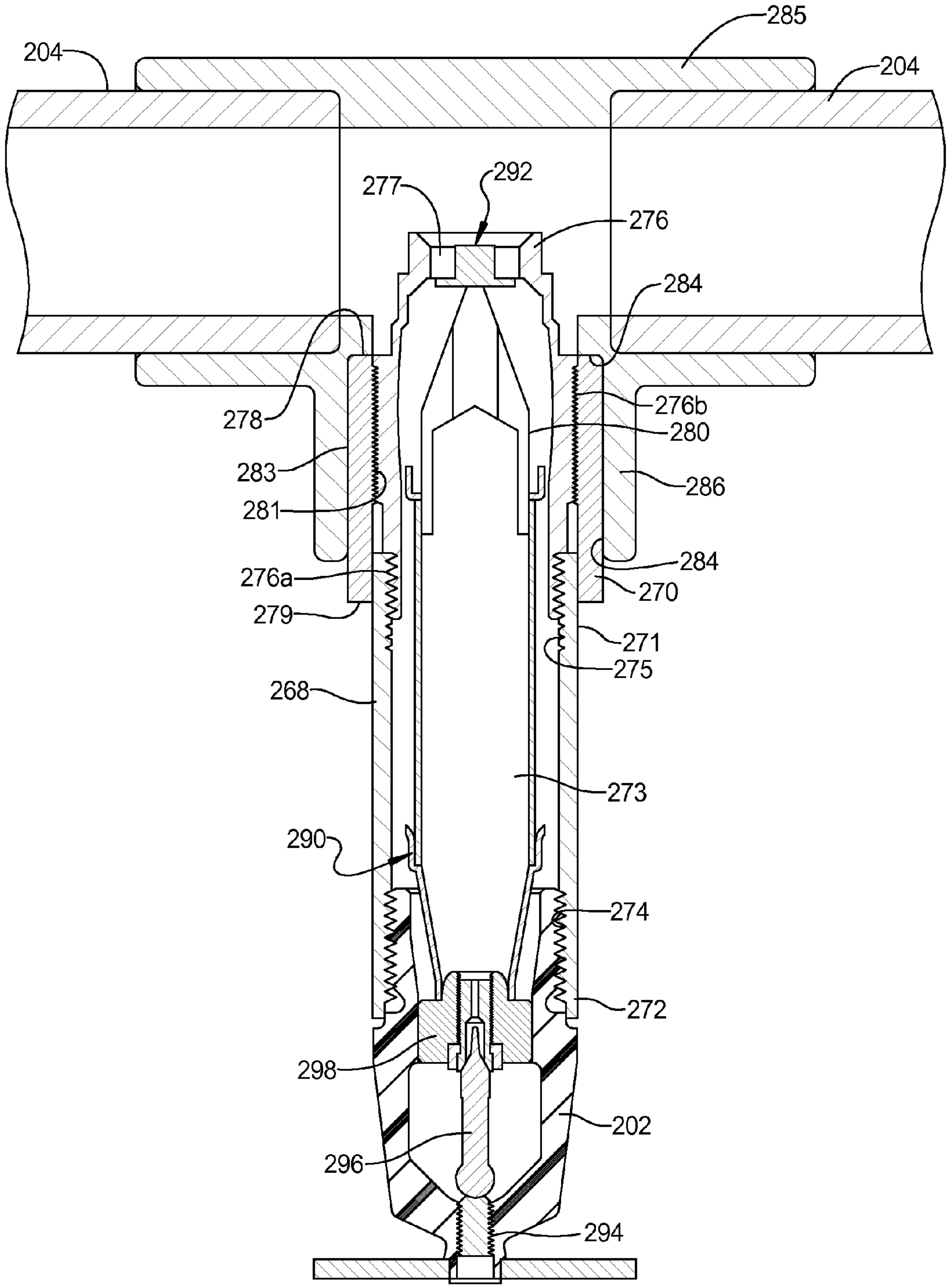

Referring now to FIGS. 7-10, a dry sprinkler assembly 200 according to the present disclosure is shown. Dry sprinkler assembly 200 includes a sprinkler 202 that can be attached to a piping system 204 (FIG. 9) of a fire extinguishing system with an extension member 268 and fitting 270. Dry sprinkler assembly 200 can be used in both a dry and wet pipe fire extinguishing system. Extension member 268 can be metal, such as schedule 40 black iron. As best shown in FIG. 10B, extension member 268 has opposite inlet and outlet ends 271, 272 with an internal passageway 273 extending therebetween (FIG. 10). Passageway 273 can have a first internally threaded section 274 that can receive a threaded portion of sprinkler 202. Sprinkler 202 and extension member 268 form a fluid-tight seal therebetween at the outlet end 272. Passageway 273 can have another internally threaded section 275 adjacent inlet end 271. Threaded section 275 can be configured to receive an externally threaded section or portion 276*a* of an inlet member 276. Inlet member 276 includes a central opening 277 that forms a passageway through inlet member 276 to allow water or fire extinguishing fluid within piping system 204 to flow therethrough and to sprinkler 202. Inlet member 276 can be metal, such as brass, by way of non-limiting example.

Extension member 268 can be attached to piping system 204 with fitting 270. Fitting 270 can extend over the exterior surface of extension member 268. Fitting 270 includes opposite inlet and outlet ends 278, 279 and a central passageway 280 extending therebetween. Passageway 280 is dimensioned to fit over and engage with the exterior surface of extension member 268. Fitting 270 can be plastic, such as CPVC by way of non-limiting example. Fitting 270 can be retained on extension member 268 in a variety of manners. For example, as shown in FIG. 10A, fitting 270 can be welded to extension member 268 and/or inlet member 276 by an adhesive solvent, and the like. The attachment of fitting 270 to extension member 268 can form a fluid-tight seal therebetween. In some embodiments, as shown in FIG. 10B, passageway 280 can include a threaded section 281 that engages with a complementary threaded section 276*b* on the exterior surface of inlet member 276. A sealing material, such as sealing tape, can be wrapped around threaded section 276*b* of inlet member 276 and fitting 270 can be attached thereto by relative rotation while threaded sections 281, 276 *b* are engaged and a fluid-tight seal is formed.

The dry sprinkler assembly 200 includes a load mechanism 290 for applying a sealing load to a closure member 292 disposed at an inlet end of the inlet member 276. A load mechanism 290 of a known type is disclosed in commonly assigned U.S. Patent Publication No. 2007/0187116, which is incorporated by reference. It is noted that other forms of load mechanism can also be utilized in the dry sprinkler assembly 200. The load mechanism 290 is compressed against the closure member 292 by a load screw 294 disposed against a frangible heat responsive trigger 296 that engages a support plug 298 that is disposed against the load mechanism 290. The load screw 294 is threadedly engaged with a threaded aperture provided in the apex of the frame of sprinkler 202 for applying the compression load.

Dry sprinkler assembly 200 can come preassembled with fitting 270, sprinkler 202, and inlet member 276 all secured to extension member 268 with the load mechanism 290 disposed therein. Sprinkler assembly 200 can be attached to piping system 204. Specifically, a surface of inlet end 278 and an exterior surface 283 of fitting 270 can engage with the interior surface 284 around a bore 286 of a T-joint 285 of piping system 204. Specifically, fitting 270 can be coupled to T-joint 285 with a solvent adhesive, as known in the art. As shown in FIG. 10, when dry sprinkler assembly 200 is attached to piping system 204, inlet member 276 communicates with the interior of piping system 204 such that water or fire extinguishing fluid within piping system 204 can travel through dry sprinkler assembly 200 and exit sprinkler 202 when activated. Thus, dry sprinkler assembly 200 allows a sprinkler 202 to be coupled to piping system 204 without a threaded engagement with piping system 204. Elimination of the threaded engagement can eliminate the possibility of over-tightening dry sprinkler assembly 200 on piping system 204 which may cause damage to piping system 204, requiring subsequent repair.

Referring now to FIGS. 11-14, a dry sprinkler assembly 300 according to the present disclosure is shown. Dry sprinkler assembly 300 is similar to dry sprinkler assembly 200 described above. As such, only the main differences will be described.

Dry sprinkler assembly 300 is attached to piping system 304 in a different manner than sprinkler system 200. In particular, dry sprinkler assembly 300 utilizes an attachment system 388 to attach to piping system 304. Attachment system 388 includes first and second fittings 389, 390 and a clamping device 387. First and second fittings 389, 390 can be plastic, such as CPVC, or metal, such as steel, by way of non-limiting example. First fitting 389 extends over the exterior surface of extension member 368. First fitting 389 includes opposite inlet and outlet ends 391, 392 and a central opening 393 extending therebetween. Opening 393 is dimensioned to fit over and engage with the exterior surface of extension member 368. First fitting 389 can be retained on extension member 368 in a variety of manners. For example, first fitting 389 can be welded to extension member 368 by an adhesive solvent, and the like, such as that described above with reference to sprinkler assembly 200 and FIG. 10A. The attachment of first fitting 389 to extension member 368 can form a fluid-tight seal therebetween. In some embodiments, opening 393 can include a threaded section 402 that engages with a complementary threaded section on the exterior surface of inlet member 376, such as that discussed above with reference to sprinkler assembly 200 and FIG. 10B. A sealing material, such as a sealing tape, can be wrapped around the threaded section of inlet member 376 and first fitting 389 can be attached thereto by relative rotation while the threaded sections are engaged and a fluid-tight seal formed.

Figure 11:
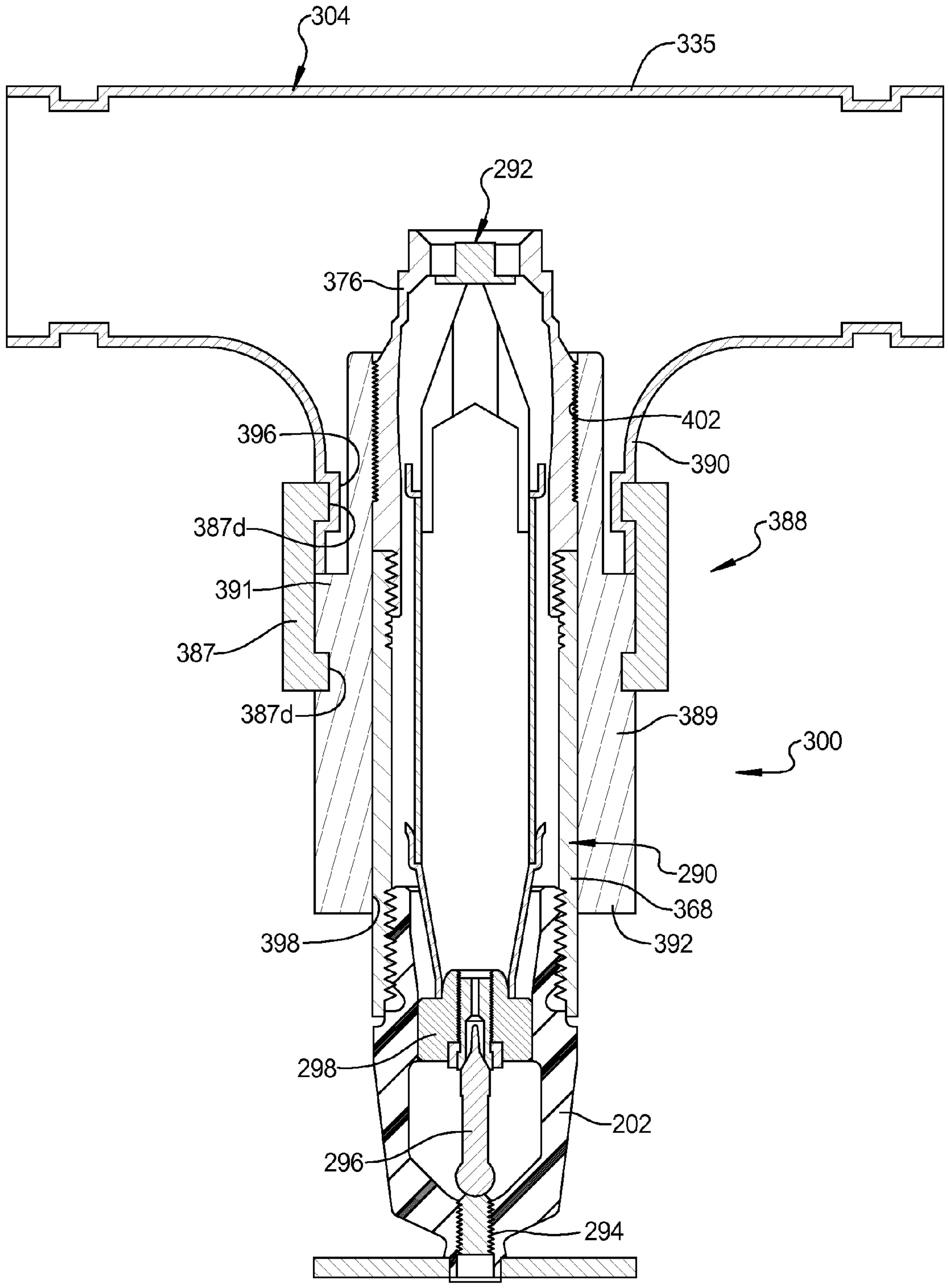
FIG. 11 is a cross-sectional view of a further embodiment of a dry sprinkler assembly coupled to a piping system of a fire extinguishing system.
Figure 12:
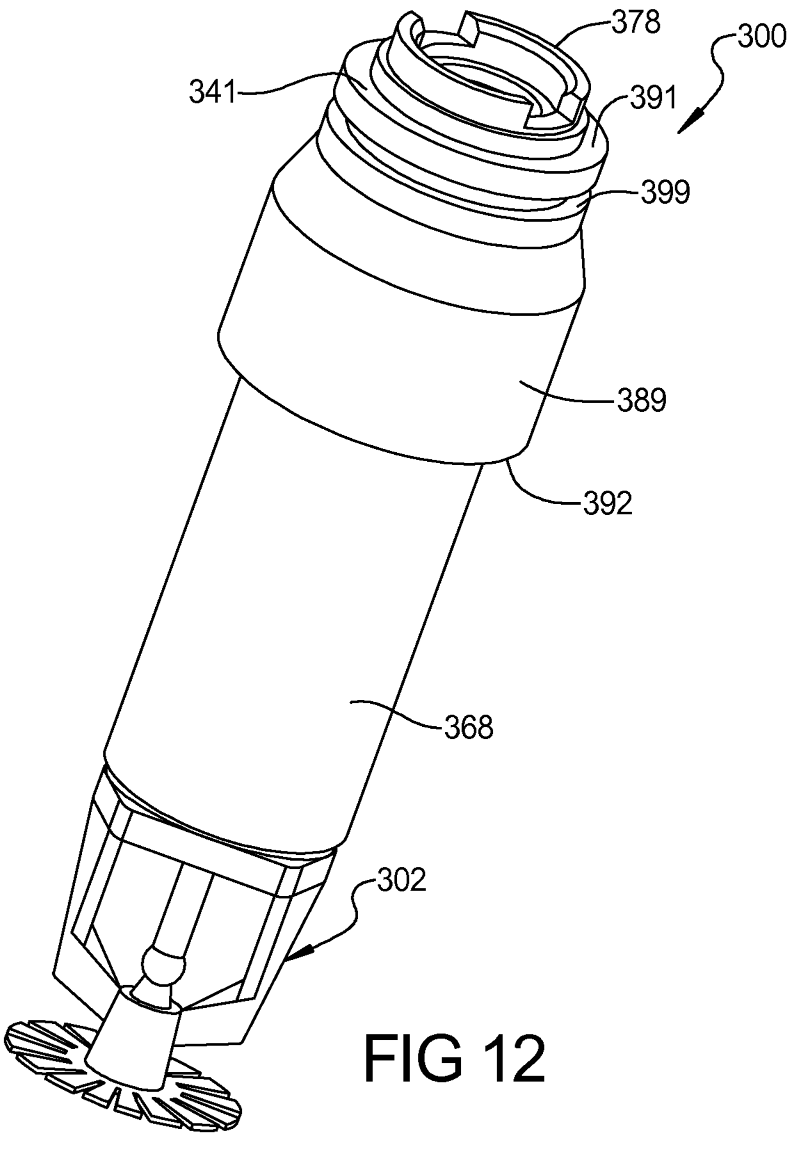
FIG. 12 is a perspective view of a dry sprinkler assembly including the fitting and extension member of FIG. 11 along with a sprinkler and inlet member attached thereto.
Figure 13:
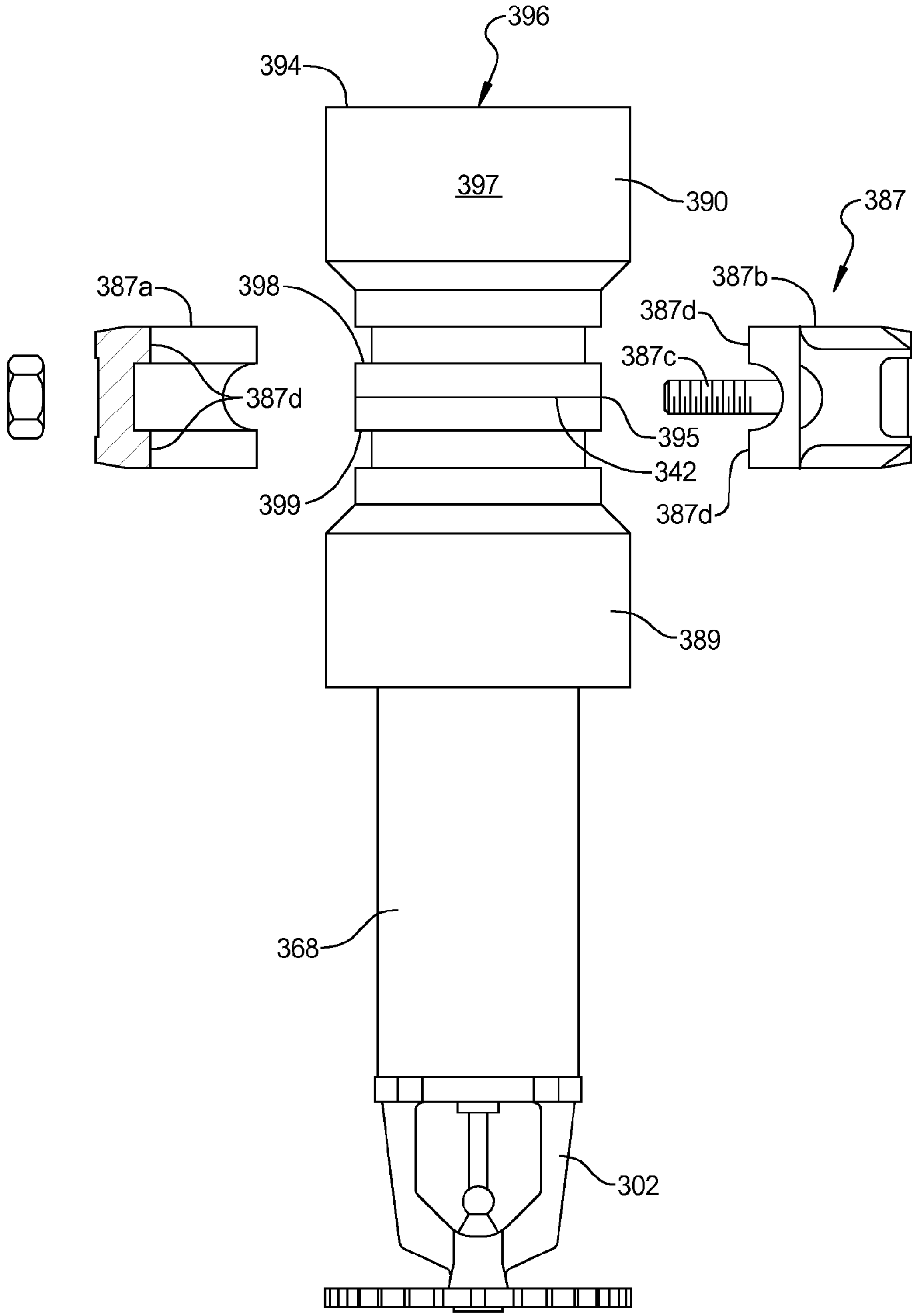
FIG. 13 is an assembly view showing the sprinkler assembly of FIG. 12 along with a mating fitting and clamping device that secures the fittings together.
Figure 14:
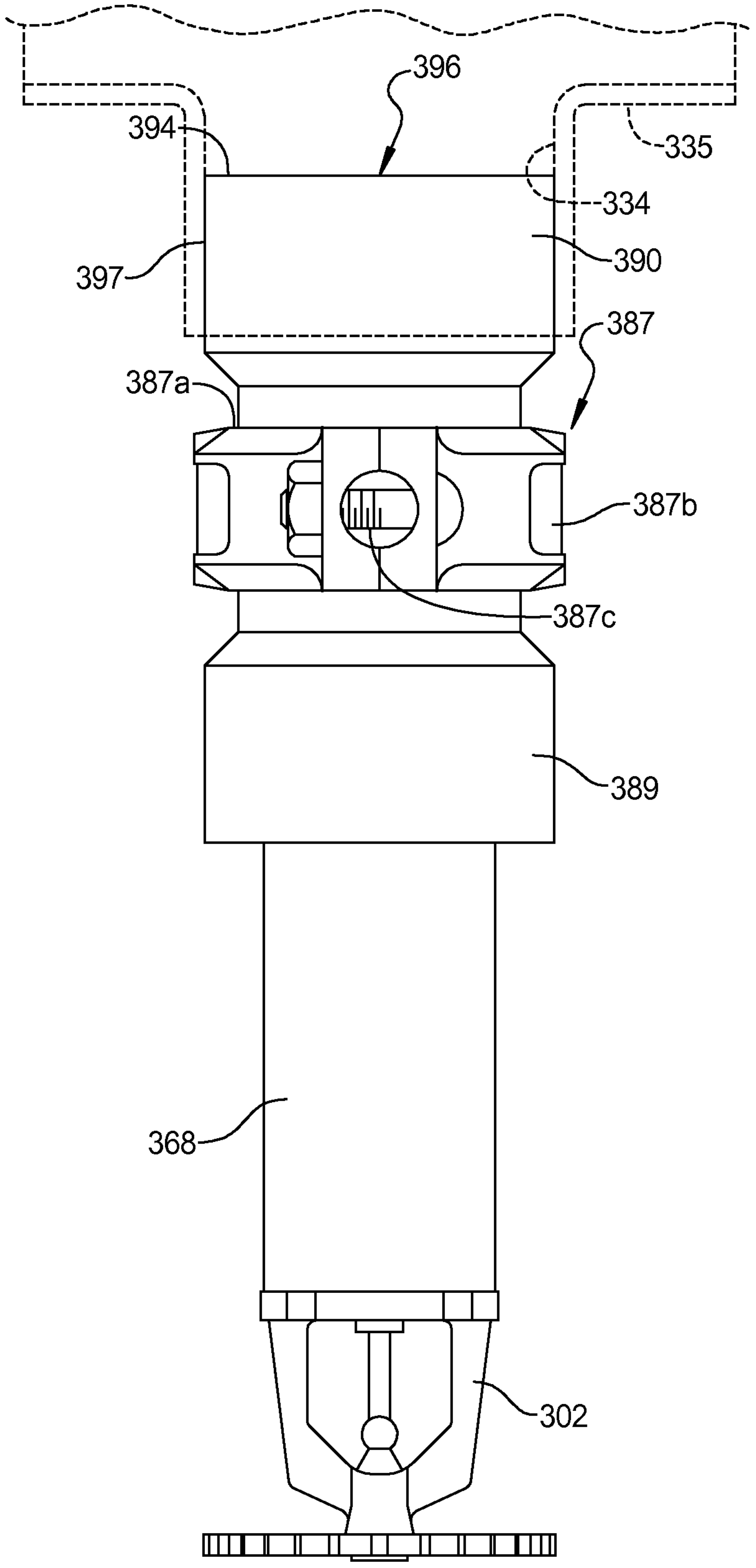
FIG. 14 is a fragmented plan view of the sprinkler assembly of FIG. 13 coupled to a piping system of a fire extinguishing system.

Second fitting 390 is configured to be attached to a T-joint 335 or an elbow joint of piping system 304 and includes a central opening 396 extending therebetween. The second fitting 390 is configured to be attached to (as illustrated in FIGS. 13 and 14) or integrally formed with T-joint 335, as illustrated in FIG. 11. In particular, where the second fitting 390 is separately attached, a mating surface 397 on inlet end 394 can be solvent welded to mating surface 334 on T-joint 335. The solvent welding can form a fluid-tight seal between second fitting 390 and piping system 304.

Clamping device 387 can clamp first and second fittings 389, 390 together in a fluid-tight connection. First and second fittings 389, 390 each include an annular recess 398, 399 adjacent outlet end 395 and adjacent inlet end 391 of second and first fittings 390, 389, respectively. Additionally, inlet end 391 of first fitting 389 includes a mating surface 341 that can engage with a complementary mating surface 342 on outlet end 395 of second fitting 390. Clamping device 387 includes a pair of semi-cylindrical ring portions 387*a*, 387*b* attached to one another by fasteners 387*c*, each of the ring portions include a pair of radially inwardly extending ribs 387*d* that engage annular recesses 398, 399, respectively when engaged in a clamped position, as best shown in FIG. 11. Various types of fasteners, such as threaded fasteners or toggles, can be used to secure the clamp ring portions 387*a*, 387*b* together. Clamping devices of this type are well known in the art. Thus, clamping device 387 can secure first and second fittings 389, 390 together in a fluid-tight manner.

The dry sprinkler assembly 300 includes a load mechanism 290 for applying a sealing load to a closure element 292 disposed at an inlet end of the inlet member 376. A load mechanism 290 of a known type is disclosed in commonly assigned U.S. Patent Publication No. 2007/0187116 which is incorporated by reference. It is noted that other forms of load mechanism can also be utilized in the dry sprinkler assembly 300. The load mechanism 290 is compressed against the closure member 292 by a load screw 294 disposed against a heat responsive trigger 296 that engages a support plug 298 that is disposed against the load mechanism 290.

To attach sprinkler assembly 300 to piping system 304, the installer attaches second fitting 390 to a T-joint 335 with a solvent weld or alternatively uses a second fitting integrally formed with a T-joint. With second fitting 390 secured to T-joint 335, the rest of sprinkler assembly 300 can be attached thereto by aligning first and second fittings 389, 390 with one another and attaching clamping device 387 thereto. If service of sprinkler assembly 300 is required, clamping device 387 can removed therefrom and service to dry sprinkler assembly 300 can commence. Clamping device 387 can be used to again retain dry sprinkler assembly 300 to piping system 304, thus forming a reusable joint to attach sprinkler assembly 300 to piping system 304.

Dry sprinkler assembly 300 advantageously allows the attachment of a sprinkler to piping system 304 without requiring a threaded engagement to piping system 304. The elimination of a threaded engagement removes the possibility of over-tightening a sprinkler assembly on piping system 304 and a subsequent potential to damage piping system 304 such that repair is required.

While the various sprinkler assemblies 100, 200, 300 are described herein with reference to specific examples, it should be appreciated that variations in the sprinkler assemblies can be made and that such variations are within the spirit and scope of the present disclosure. For example, the various features in sprinkler assemblies 100, 200, 300 can be mixed and matched with one another to provide a desired functionality. Additionally, these various features can be used in both a wet pipe system and a dry pipe system. When utilized in the differing systems, the appropriate sprinklers and internal trigger mechanisms can be utilized to allow the water or fire extinguishing fluid to be in the desired locations and released when the thermally responsive element is activated. Additionally, it should be appreciated that while specific materials of construction are referred to herein, other materials of construction may be utilized in the sprinkler assemblies. Thus, the preceding description is merely exemplary in nature and variations can be made that do not depart from the spirit and scope of the present disclosure.

What is claimed is:

1. A sprinkler assembly comprising:

a sprinkler including a thermally responsive element;

an extension member having opposite first and second ends and an internal passageway extending therebetween, said first end of said extension member coupled to said sprinkler; and an attachment system operable to couple said sprinkler and said extension member to an access member of a piping system in a fluid-tight arrangement, said attachment system including:

a first polymeric fitting attached to said extension member adjacent said second end, said first fitting including a first engaging surface;

a second polymeric fitting including opposite second and third engaging surfaces with an internal passageway extending therebetween, said third engaging surface configured for solvent welding to said access member of said piping system; and a clamping member clamping said first and second fittings together with said first and second engaging surfaces facing one another, wherein said clamping member and said first and second fittings form a fluid-tight connection between said piping system and said extension member.

2. The sprinkler assembly of claim 1, wherein said first fitting is solvent welded to said extension member.

3. The sprinkler assembly of claim 1, wherein said first fitting includes internal threads, said extension member includes external threads, and said first fitting is attached to said extension member by engagement of said threads.

4. The sprinkler assembly of claim 1, further comprising an inlet member attached to said second end of said extension member and extending beyond said first engaging surface of said first fitting.

5. The sprinkler assembly of claim 1, wherein said first and second fittings are CPVC.

6. The sprinkler assembly of claim 1, wherein an exterior surface of said first fitting includes a first annular recess adjacent said first engaging surface, an exterior surface of said second fitting includes a second annular recess adjacent said second engaging surface, and said clamping member engages with said first and second annular recesses to secure said first and second fittings together and forms said fluid-tight connection.

7. The sprinkler assembly of claim 1, wherein said sprinkler assembly is a dry sprinkler assembly further comprising a closure member disposed at said second end of said extension member, said closure member being engaged by a load mechanism extending through said extension member and secured therein by said thermally responsive element.

8. The sprinkler assembly according to claim 7, further comprising an inlet member supported at said second end of said extension member and defining a seat surface for supporting said closure member.

* * * * *